United States Patent [19]

Heikkilä

[11] Patent Number: 4,485,693
[45] Date of Patent: Dec. 4, 1984

[54] ECCENTRIC-OPERATED VIBRATING APPARATUS

[75] Inventor: Hannu Heikkilä, Oulu, Finland

[73] Assignee: Oy Tampella AB, Tampere, Finland

[21] Appl. No.: 291,590

[22] Filed: Aug. 10, 1981

[30] Foreign Application Priority Data

Aug. 26, 1980 [FI] Finland ................... 802694

[51] Int. Cl.³ .................. F16H 35/08; G05G 1/00
[52] U.S. Cl. ........................... 74/836; 74/835; 74/571 L
[58] Field of Search .............. 74/835, 836, 571 R, 74/571 L, 571 M, 49, 50, 55, 26

[56] References Cited

U.S. PATENT DOCUMENTS

| | | | |
|---|---|---|---|
| 321,001 | 5/1885 | Black et al. | 74/571 L |
| 829,933 | 8/1906 | Rishel | 74/836 |
| 1,631,466 | 6/1927 | Buffardi | 74/571 R |
| 1,966,209 | 7/1934 | Miller | 74/625 |
| 2,404,175 | 7/1946 | Holden et al. | 74/571 L |
| 2,590,745 | 3/1952 | Wuensch | 74/625 |
| 3,324,741 | 6/1967 | Anderson | 74/625 |

FOREIGN PATENT DOCUMENTS

| | | | |
|---|---|---|---|
| 536133 | 1/1957 | Canada | 74/571 |
| 332781 | 11/1921 | Fed. Rep. of Germany | 74/836 |
| 2903395 | 7/1980 | Fed. Rep. of Germany | |
| 1149273 | 4/1969 | United Kingdom | |
| 1503389 | 3/1978 | United Kingdom | |
| 1519199 | 7/1978 | United Kingdom | |
| 2041143 | 9/1980 | United Kingdom | |

Primary Examiner—Allan D. Herrmann
Assistant Examiner—Michael J. Gonet
Attorney, Agent, or Firm—Lester Horwitz

[57] ABSTRACT

A vibrating apparatus e.g. for shaking the forming wire of a paper machine, comprising a body (1) and a drive shaft (2) rotatably mounted in the body. The drive shaft supports an eccentric bushing (3) displaceable along but nonrotatably fixed to said drive shaft. A reciprocating rod (9) positioned transversely with respect to the drive shaft is provided with a ring-shaped end (10) rotatably mounted around an outer mantle surface of said bushing stationary in the axial direction (D) of said bushing. The apparatus further comprises adjusting means (11-20) for displacing said bushing along the drive shaft in its axial direction in order to adjust the eccentricity between the drive shaft and the ring-shaped end of the reciprocating rod.

5 Claims, 4 Drawing Figures

ECCENTRIC-OPERATED VIBRATING APPARATUS

This invention relates to a vibrating apparatus comprising a body, a drive shaft rotatably mounted in the body, an eccentric supported by the drive shaft to rotate therewith, the longitudinal axis of the outer mantle surface of said eccentric forming an angle with the axis of the drive shaft, a reciprocating rod positioned transversely with respect to the drive shaft, said rod having a ring-shaped end rotatably mounted around said outer mantle surface of the eccentric, and adjusting means for altering the position of the ring-shaped end of the reciprocating rod with respect to the eccentric in the direction of the longitudinal axis of the eccentric in order to adjust the eccentricity between the drive shaft and the ring-shaped end of the reciprocating rod.

When manufacturing certain paper qualities some portions of the wire section must be shaken so that the wire and the fiber web supported thereon reciprocate in the wire level in the transverse direction of the machine. For this purpose the wire frame or the register rolls are subjected to vibration.

This is usually accomplished by means of eccentric-operated vibrating apparatuses wherein the eccentric element consists of an oblique cylinder whch is fixed on the rotating drive shaft in such a way that the longitudinal axis of the eccentric forms an angle with the axis of the drive shaft. The ring-shaped end of the reciprocating rod is mounted around the eccentric and the length of the shaking movement can be adjusted by displacing the ring-shaped end of the reciprocating rod along the eccentric in a direction transverse to that of the reciprocating rod. Due to this transverse displacement the reciprocating rod is brought into an oblique position which makes it more difficult to transfer the vibrating force to the elements to be vibrated.

Another known vibrating apparatus is based on a so called Oldham coupling. In this apparatus two shafts are connected by an Oldham coupling. The reciprocating rod is mounted around the central piece of the coupling. The length of the stroke can be adjusted by displacing one shaft relative to the other so that the axes of rotation of the shafts remain parallel while their distance from each other changes. A disadvantage of this apparatus is the great amount of rapidly wearing slide surfaces.

British patent specification No. 1 049 835 discloses a vibrating apparatus which is characterized in that the vibrating part rotates and reciprocates at the same time inside a rotating tubular shaft. A disadvantage with this apparatus is that the transmission of power to the wire section is difficult because of the rotational movement. The sealing facing the reciprocating rod requires frequent maintenance.

Finnish patent specification 46 419 discloses a vibrating apparatus based on two eccentric parts arranged one inside the other. In this apparatus the length of the stroke is adjusted by turning the eccentric parts relative to each other by means of an Oldham coupling and a chain mechanism. A disadvantage of this apparatus is its complicated, continuously moving adjustment mechanism which comprises many wearing parts.

The vibrating apparatus according to the present invention is based on the first-mentioned, eccentric-operated type and the object of the invention is to provide a vibrating apparatus of this type, however, without the above-mentioned disadvantages. This object is achieved by means of a vibrating apparatus according to the invention, which is mainly characterized in that the eccentric consists of a bushing displaceable along but nonrotatably fixed to the drive shaft, the outer mantle surface of said bushing defining the outer mantle surface of said eccentric, that the ring-shaped end of the reciprocating rod is fixed with respect to the drive shaft in its axial direction, and that the adjusting means are arranged to move said bushing along the drive shaft in its axial direction.

The invention provides a vibrating apparatus in which the displacement of the ring-shaped end of the reciprocating rod and the eccentric relative to each other which is necessary in order to adjust the eccentricity between the ring-shaped end of the reciprocating rod and the drive shaft, is accomplished without displacing the reciprocating rod in the transverse direction. Because the eccentric bushing is arranged displaceably along the drive shaft, the ring-shaped end of the reciprocating rod can be mounted so that it is stationary in the axial direction of the drive shaft so that the reciprocating rod maintains its transverse position relative to the drive shaft during the adjustment, and no transverse displacement of the rod takes place. This facilitates a simple transmission of the vibrating movement and the vibrating force to the elements to be vibrated.

In the following the invention will be described in more detail with reference to the accompanying drawings.

Figure 1:
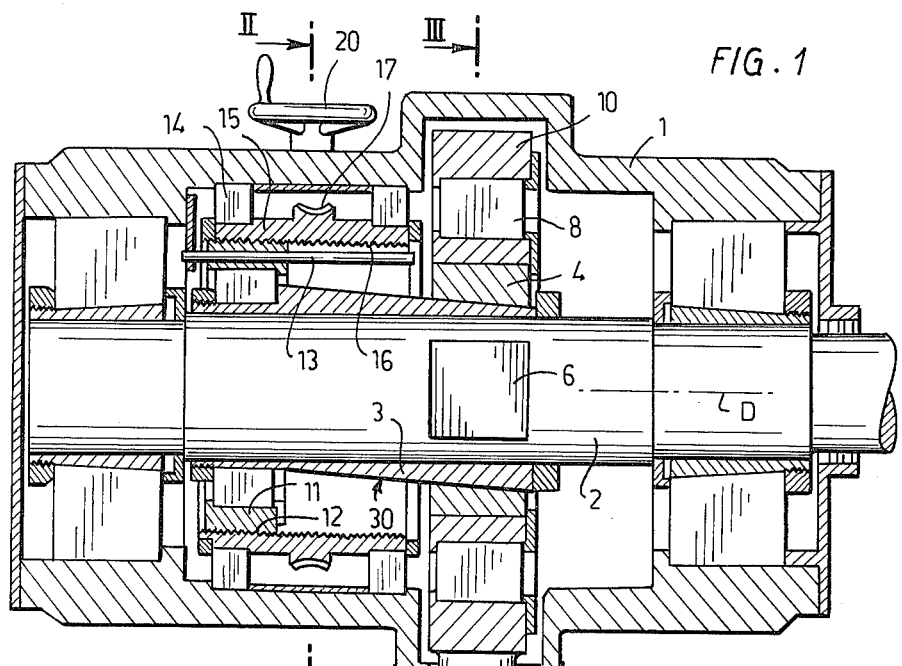
FIG. 1 is an axial cross-sectional top view of a preferred embodiment of a vibrating apparatus according to the invention.
Figure 4:
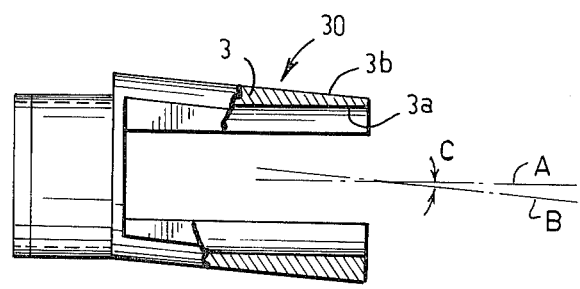
FIG. 4 is a partial axial cross-section of the eccentric bushing.
Figure 2:
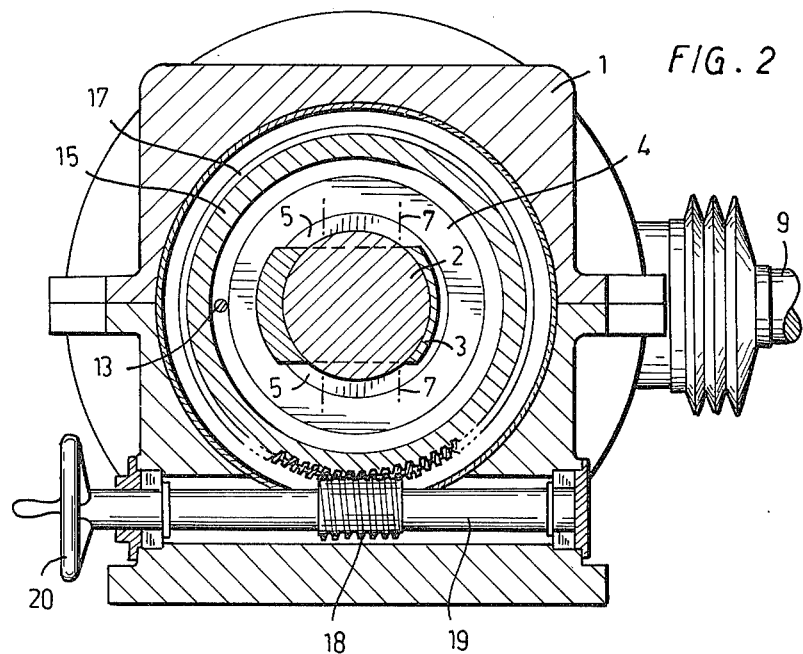
FIG. 2 is a cross-section along line II—II in FIG. 2.
Figure 3:
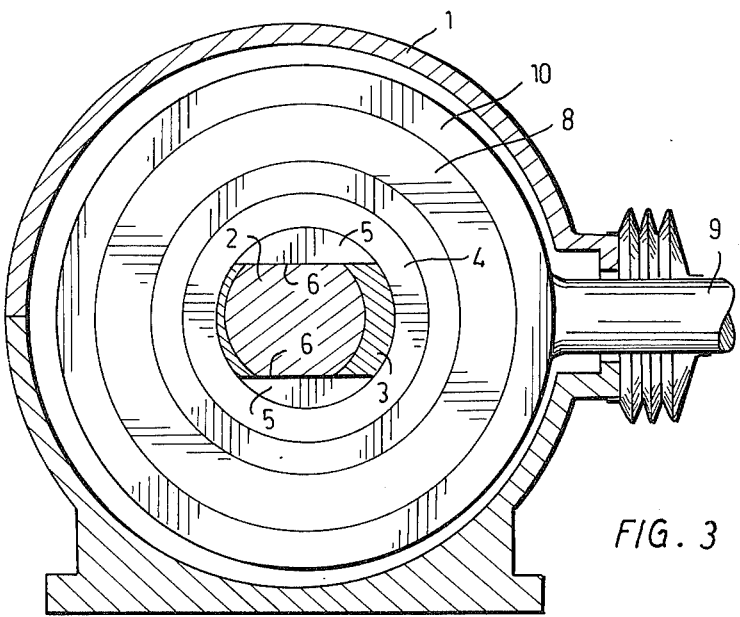
FIG. 3 is a cross-section along line III—III in FIG. 1.

The vibrating apparatus shown in the drawings comprises a stationary body 1 and a drive shaft 2 which is rotatably mounted in the body. The drive shaft supports a wedged bushing 3 which forms an eccentric 30 and comprises a cylindrical center hole 3a and a cylindrical outer mantle surface 3b, longitudinal axes of which, A and B respectively, form an angle C. Around the bushing is positioned an intermediate ring 4. The axis of the inner mantle surface 4a of the ring forms with the axis of the outer mantle surface 4b an angle equal to the above-mentioned angle C of the bushing 3. The bushing is mounted so that it is axially slidable on the drive shaft but is prevented from turning around the shaft due to guide pieces 5 which have the shape of a circle segment and fit into grooves 6 on two opposite sides of the shaft. The guide pieces are fastened to the intermediate ring 4 by appropriate means 7, FIG. 2, so that the guide pieces lock the intermediate ring so that it is axially stationary on the drive shaft. In order to allow the bushing to slide axially on the drive shaft in spite of the guide pieces 5, the bushing is fork-shaped as shown in FIG. 4. In this way the guide pieces 5 prevent axial displacement of the intermediate ring 4 on the drive shaft 2, but the ring 4 can be displaced the direction transverse to the drive shaft 2 because the guide pieces are free to move in the grooves in the direction transverse to the drive shaft.

The ring-shaped end 10 of the reciprocating rod 9 is rotatably mounted by means of a bearing 8 around the intermediate ring 4. The reciprocating rod is arranged transversely with respect to the drive shaft 2 and its projects from the body through an opening in the side of the body.

On the other end of the bushing 3 there is rotatably mounted an adjustment ring 11 coaxial with the drive shaft. The outer mantle surface of the adjustment ring is provided with external threads 12. A guide pin 13 extends through the adjustment ring, which pin is parallel to the drive shaft. The outer end of the pin is fastened to the body 1. The guide pin prevents the adjustment ring from rotating with the bushing, allowing, however, the adjustment ring to be displaced in the axial direction of the drive shaft. An adjustment bushing 15 is rotatably mounted by bearings 14 on the body. The bushing 15 extends around the adjustment ring and is coaxial with the drive shaft. The bearings 14 prevent axial displacement of the adjustment bushing 15. The inner mantle surface of the adjustment bushing 15 is provided with internal threads 16 which are in engagement with the outer threads of the adjustment ring. The outer mantle surface of the adjustment bushing 15 is provided with a worm wheel 17 engaged with a worm 18 provided on a shaft 19 rotatably mounted in the body and provided with an external handle wheel 20.

The vibrating apparatus operates as follows:

The drive shaft 2 is rotated by power means not shown, whereby the reciprocating rod 9 fastened to the object to be vibrated starts to reciprocate. The stroke of the reciprocating movement depends on the position of the wedged bushing 3 with respect to the intermediate ring 4. By displacing the bushing along the drive shaft, the eccentricity of the intermediate ring with respect to the drive shaft can be adjusted. The eccentric bushing 3 is displaced axially by rotating the wheel 20, whereby the worm gear 17,18 rotates the threaded bushing 15, so that the inner threads of the bushing displace the adjustment ring 11 and thereby also the eccentric bushing either towards or away from the middle ring. The axial movement of the eccentric bushing 3 displaces the intermediate ring 4 in a plane perpendicular to the drive shaft 2 so that the eccentricity of the intermediate ring changes.

It is evident that the length of the stroke of the reciprocating movement can be adjusted without moving the reciprocating rod transversally from the original position, because the eccentricity is adjusted by displacing the special eccentric bushing along the drive shaft. The angle of ascent of the bushing is so small that any attempt of the bushing to move in the axial direction of the drive shaft and to change the set adjustment is prevented by means of friction.

The drawings and the description only intend to illustrate the idea of the invention. In its details the vibrating apparatus according to the invention may vary within the scope of the claims. Instead of the adjustment bushing and the adjustment ring, e.g. screws or a fork mechanism, generally used in couplings, can be used, and instead of the worm gear some other appropriate gear can be used.

What I claim is:

1. A vibrating apparatus comprising a body (1), a drive shaft (2) rotatably mounted in the body, bushing (3) defining an eccentric (30) supported displaceably along the drive shaft an nonrotatable with respect to the drive shaft, a longitudinal axis (B) of an outer mantle surface (3b) of said bushing forming an angle (C) with an axis (D) of the drive shaft, a connecting rod (9) disposed transversely with respect to the drive shaft, a loop-shaped end of said rod (9) being mounted rotatably around the outer mantle surface of the bushing, an adjusting means (11-20) for displacing the bushing (3) along the drive shaft (2) in a direction of the axis (D) and an intermediate ring (4) mounted on the outer mantle surface (3b) of the bushing (3), the axis of an inner mantle surface of said ring (4) coinciding with the longitudinal axis (B) of the outer mantle surface of the bushing (3) and an axis of the outer mantle surface of said ring (4) being parallel to the axis (D) of the drive shaft (2), a locking means (5) fixed to said intermediate ring (4) and supported by said drive shaft (2) in grooves (6) on opposite sides of said shaft (2) so as to be slidable in a plane perpendicular to the axis (D) of said shaft (2) so that the intermediate ring (4) is mounted nonrotatably and axially stationary with respect to the drive shaft (2), said locking means (5) having the shape of circle segments and said housing (3) being fork-shaped and extending axially between said locking means and said shaft, the outer mantle surface of said bushing and an outer mantel surface of said locking means (5) defining a cylindrical surface.

2. A vibrating apparatus according to claim 1, in which an inner and outer mantle surfaces (3a,3b) of the eccentric bushing (3) are cylindrical.

3. A vibrating apparatus according to claim 1, in which said adjusting means (11-20) are in engagement with one end of the bushing (3).

4. A vibrating apparatus according to claim 1, in which the adjusting means comprises an adjustment ring (11) in which the bushing (3) is mounted so that it is rotatable and axially stationary with respect to said adjustment ring 11, an outer mantle surface of said adjustment ring (11) having a thread (12), the thread (12) engaging a thread (16) on an inner mantle surface of an adjustment bushing (15), said adjustment bushing (15) being mounted in the body (1) so that the adjustment bushing is rotatable and axially stationary with respect to the body (1), the adjustment ring (11) being mounted in the body (1) so that the adjustment ring (11) is nonrotatable and axially displaceable in a direction of the axis (D) of the drive shaft (2), and a worm shaft (18, 19) rotatably mounted in the body, said worm shaft being in engagement with the adjustment bushing (15) in order to rotate the adjustment bushing (15) about an axis of the adjustment bushing (15).

5. A vibrating apparatus according to claim 1, in which the adjusting means comprises an adjustment ring (11) in which the bushing (3) is mounted so that it is rotatable and axially stationary with respect to said adjustment ring 11, an outer mantle surface of said adjustment ring (11) having a thread (12), the thread (12) engaging a thread (16) on an inner mantle surface of an adjustment bushing (15), said adjustment bushing (15) being mounted in the body (1) so that the adjustment bushing is rotatable and axially stationary with respect to the body (1), the adjustment ring (11) being mounted in the body (1) so that the adjustment ring (11) is nonrotatable and axially displaceable in a direction of the axis (D) of the drive shaft (2), and a worm shaft (18, 19) rotatably mounted in the body, said worm shaft being in engagement with the adjustment bushing (15) in order to rotate the adjustments bushing (15) about an axis of the adjustment bushing (15).

* * * * *